(12) United States Patent
van Noesel et al.

(10) Patent No.: US 11,703,286 B2
(45) Date of Patent: Jul. 18, 2023

(54) FLUID COOLERS, HEAT EXCHANGERS, SEAL ASSEMBLIES AND SYSTEMS INCLUDING FLUID COOLERS OR HEAT EXCHANGERS AND RELATED METHODS

(71) Applicant: Flowserve Management Company, Irving, TX (US)

(72) Inventors: Ronald van Noesel, Roosendaal (NL); Dennis van Graefschepe, Roosendaal (NL); Frank Oomen, Roosendaal (NL)

(73) Assignee: FLOWSERVE PTE. LTD., Singapore (SG)

( * ) Notice: Subject to any disclaimer, the term of this patent is extended or adjusted under 35 U.S.C. 154(b) by 0 days.

(21) Appl. No.: 17/044,451

(22) PCT Filed: Apr. 12, 2019

(86) PCT No.: PCT/IB2019/000494
§ 371 (c)(1),
(2) Date: Oct. 1, 2020

(87) PCT Pub. No.: WO2019/197907
PCT Pub. Date: Oct. 17, 2019

(65) Prior Publication Data
US 2021/0041184 A1 Feb. 11, 2021

Related U.S. Application Data

(60) Provisional application No. 62/657,343, filed on Apr. 13, 2018.

(51) Int. Cl.
*F28F 1/04* (2006.01)
*F28F 1/36* (2006.01)
(Continued)

(52) U.S. Cl.
CPC .................. *F28F 1/36* (2013.01); *F28F 1/40* (2013.01); *F28D 1/0472* (2013.01); *F28D 7/028* (2013.01)

(58) Field of Classification Search
CPC .......... F28D 7/028; F28D 1/0472; F28F 1/36; F24H 1/43; F22B 21/26; F16J 15/3404; F04D 29/58
See application file for complete search history.

(56) References Cited

U.S. PATENT DOCUMENTS 1,992,297 A * 2/1935 Dewald ................... B21C 37/26
165/184
2,965,744 A * 12/1960 Busse .................. B23K 11/084
29/890.048

(Continued)

FOREIGN PATENT DOCUMENTS

CN 203949198 U * 11/2014
DE 2435563 A * 2/1976 ......... F28D 21/0007
(Continued)

OTHER PUBLICATIONS

Laserfin Tubes Brochure 16pp—downloaded Apr. 2018.
(Continued)

*Primary Examiner* — Eric S Ruppert
(74) *Attorney, Agent, or Firm* — PCFB LLC

(57) ABSTRACT

Heat exchangers include at least one looped tube having at least one section that is laterally offset from another section of the looped tube. Fluid cooling systems and seal systems may include such heat exchangers.

20 Claims, 6 Drawing Sheets

(51) Int. Cl.
*F28F 1/40* (2006.01)
*F28D 1/047* (2006.01)
*F28D 7/02* (2006.01)

(56) References Cited

U.S. PATENT DOCUMENTS

| | | | | |
|---|---|---|---|---|
| 3,053,971 | A | * | 9/1962 | Busse .................. B23K 11/084 219/107 |
| 3,118,430 | A | | 1/1964 | Russell et al. |
| 3,357,706 | A | * | 12/1967 | Wilkinson ........... F16J 15/3404 165/47 |
| 3,612,004 | A | | 10/1971 | Cancilla et al. |
| 3,802,499 | A | | 4/1974 | Garcea |
| 4,480,684 | A | | 11/1984 | Onishi et al. |
| 4,545,428 | A | * | 10/1985 | Onishi .................... F28F 1/325 165/184 |
| 5,085,272 | A | * | 2/1992 | Venables, IV ............ F28F 1/36 165/181 |
| 5,832,738 | A | * | 11/1998 | Shin .......................... F25B 5/02 62/276 |
| 6,076,597 | A | | 6/2000 | Manning et al. |
| 6,843,273 | B2 | * | 1/2005 | Brundermann ......... B21C 37/26 165/184 |
| 2005/0133202 | A1 | | 6/2005 | Jorgensen et al. |
| 2005/0269069 | A1 | | 12/2005 | Hancock |
| 2006/0260789 | A1 | * | 11/2006 | Nakagawa ................ F28F 9/26 165/145 |
| 2011/0186090 | A1 | * | 8/2011 | Publ ......................... B01D 3/00 134/107 |
| 2012/0060549 | A1 | | 3/2012 | Herrera et al. |
| 2012/0138268 | A1 | * | 6/2012 | Al-Otaibi ............... F28D 7/106 165/104.14 |
| 2017/0074600 | A1 | | 3/2017 | Gao et al. |

FOREIGN PATENT DOCUMENTS

| | | | |
|---|---|---|---|
| DE | 3218547 C1 | 4/1983 | |
| GB | 2302727 A | * 1/1997 | ............. F24D 3/082 |
| GB | 2526094 A | 11/2015 | |
| KR | 200374628 Y1 | * 1/2005 | |

OTHER PUBLICATIONS

Flowserve Seal Cooler Brochure 2pp—2000.
Flowserve Airfin Cooler Brochure 2pp—2003.
Flowserve Airfin Cooler Manual 4pp—2003.
PCT Application No. PCT/IB2019/000494, International Search Report dated Oct. 16, 2019, 5 pp.
PCT Application No. PCT/IB2019/000494, Written Opinion dated Oct. 16, 2019, 10 pp.

* cited by examiner

FLUID COOLERS, HEAT EXCHANGERS, SEAL ASSEMBLIES AND SYSTEMS INCLUDING FLUID COOLERS OR HEAT EXCHANGERS AND RELATED METHODS

PRIORITY CLAIM

This application is a national phase entry under 35 U.S.C. § 371 of International Patent Application PCT/IB2019/000494, filed Apr. 12, 2019, designating the United States of America and published in English as International Patent Publication WO 2019/197907 A1 on Oct. 17, 2019 for "Fluid Coolers, Heat Exchangers, Seal Assemblies and Systems Including Fluid Coolers or Heat Exchangers and Related Methods," which application claims the benefit of the filing date of U.S. Provisional Patent Application Ser. No. 62/657,343, filed Apr. 13, 2018, for "Fluid Coolers, Heat Exchangers, Seal Assemblies and Systems Including Fluid Coolers or Heat Exchangers and Related Methods," the disclosure of each of which is incorporated herein in its entirety by reference.

TECHNICAL FIELD

Embodiments of the disclosure relate generally to fluid coolers and/or heat exchangers and related systems and methods. Specifically, some embodiments of the disclosure relate to air cooled fluid coolers and heat exchangers for seal assemblies and systems and related methods.

BACKGROUND

Fluid heat exchangers or coolers operate on a general principal of maintaining two fluids separate from each other with a thermally conductive material, such as metal, connecting the two fluids. The fluids may be in a liquid or gaseous form, depending on the application. Heat is then transferred from the higher temperature fluid to the lower temperature fluid across the thermally conductive material, cooling the higher temperature fluid and warming the lower temperature fluid.

An example of a heat exchanger is demonstrated in, U.S. Pat. No. 6,076,597, which describes a liquid to liquid heat exchanger wherein a tube formed in a coil, with a working fluid flowing through the tube, is immersed in a cooling fluid. The tube is formed from a thermally conductive material and provides for the transfer of heat from the working fluid to the cooling fluid. Another example of a heat exchanger is demonstrated in U.S. Pat. No. 3,802,499, which describes a pipe formed in a helical coil within a casing. The pipe has external fins that extend perpendicular to the axis of the pipe. The cooling fluid is passed by the pipe in a direction parallel to the fins. The fins provide additional surface area of the thermally conductive material to provide additional heat transfer between the two fluids.

Heat exchangers may be used for removing heat from numerous processes. Some processes that utilize heat exchangers are, for example, air conditioning systems, industrial processes, internal combustion engines, industrial pumps, refrigeration systems, etc. Generally these systems utilize a cooling fluid to transfer heat generated by the process to the heat exchanger. The heat exchanger then transfers the heat from the cooling fluid to a second fluid through the heat exchanger. In many instances the second fluid is ambient air. In some processes, the second fluid may be allowed to passively move across the heat exchanger through naturally occurring wind or natural convection where a flow is induced by adding heat to the secondary fluid. In other processes, the secondary fluid may be mechanically forced across the heat exchanger using, for example, a fan, or a pump.

SUMMARY

In some embodiments, a fluid heat exchanger may include a tube and a plurality of fins. The plurality of fins may be attached to an exterior surface of the tube. The tube may be formed into a substantially conical coil.

In some embodiments, a fluid heat exchanger may include a looped tube extending around a longitudinal axis of the heat exchanger, the looped tube having at least one section that is laterally offset in a direction transverse to the longitudinal axis from another section of the looped tube.

In some embodiments, a seal system (e.g., a pump or mechanical seal) may include an air cooled fluid cooler and a seal assembly. The air cooled fluid cooler may include a conical coil and a plurality of fins. The conical coil may be formed from at least one pipe. The at least one pipe may define a plurality of stacked loops of decreasing diameter. The at least one pipe may also include the plurality of fins protruding from an exterior surface of the pipe. The seal assembly may be connected to the air cooled fluid cooler.

In some embodiments, a fluid cooling system may include a single tube, a vent, a drain, and at least two mounting flanges. The single tube may define rings of decreasing diameter. The rings may define a vertically oriented conical helix. The vent may extend from an uppermost portion of the tube and the drain may extend from a lowermost portion of the tube. The vent may include a vent valve and a vent pipe. The drain may include a drain valve and a drain pipe. The at least two mounting flanges may include a first mounting flange and a second mounting flange. The first mounting flange may connect between a top ring of the conical helix and a frame. The second mounting flange may connect between a bottom ring of the conical helix and the frame.

Some embodiments may include a fluid heat exchanger comprising a tube defining a substantially conical coil. The tube extends around a longitudinal axis of the heat exchanger and has at least one arcuate section that is laterally offset from another arcuate section of the tube in a direction transverse to the longitudinal axis. The exchanger further includes a plurality of fins attached to an exterior surface of the tube and at least one fitting on the tube to enable fluid flow into and out of the tube in order to transfer heat energy between fluid within the tube and another fluid on an exterior of the tube proximate the tube and the plurality of fins.

Some embodiments may include a seal system including a fluid cooler comprising a conical coil comprising at least one pipe defining stacked loops of decreasing diameter and fins protruding from an exterior surface of the at least one pipe. In some embodiments, the fluid cooler may comprise the heat exchangers discussed above. The seal system further includes a seal assembly connected to the fluid cooler. The fluid cooler is configured to receive fluid from a portion of the seal assembly in order to transfer heat energy between fluid within the conical coil and another fluid on an exterior of the conical coil proximate the conical coil and the fins.

Some embodiments may include methods of cooling a fluid including: transferring fluid from a fluid assembly comprising one or more fluid seals to a heat exchanger; passing the fluid through at least one finned tube defining a conical helical structure of the heat exchanger between a first end of the conical helical structure to a second end of the conical helical structure, a first portion of the conical helical structure having a diameter that is greater than an adjacent second portion of the conical helical structure; and cooling the fluid during the passing of the fluid through the conical helical structure between transferring heat energy from the fluid within the at least one finned tube to another fluid on an exterior of the at least one finned tube.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
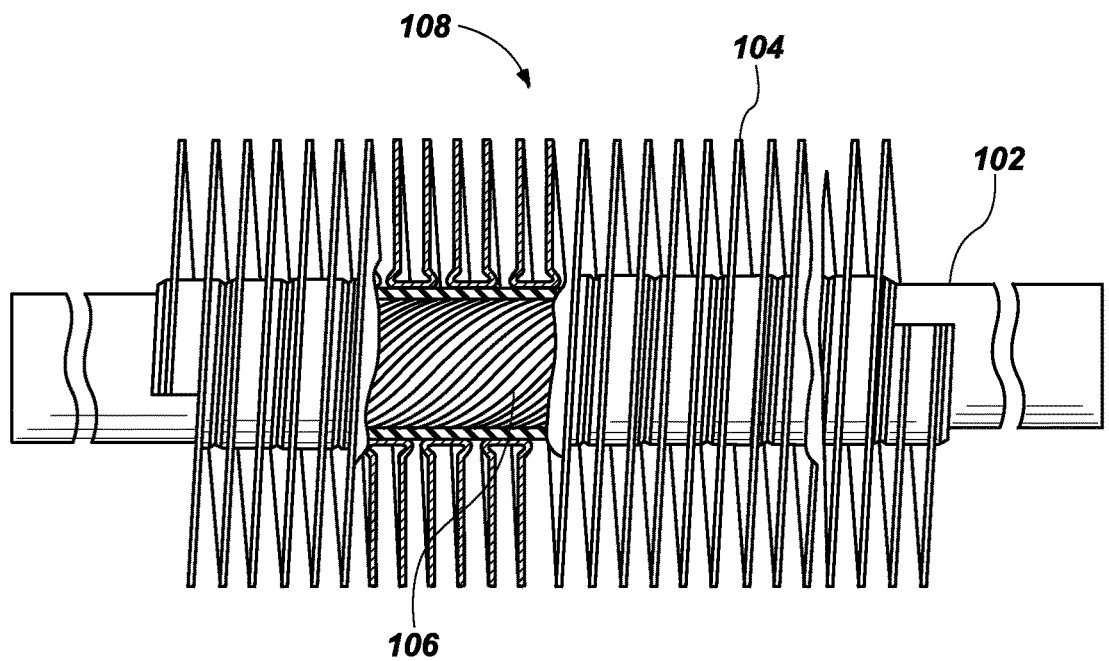
FIG. 1 is a side view of a pipe according to an embodiment of the present disclosure.

The illustrations presented herein are not meant to be actual views of any particular fluid cooler, heat exchanger, or component thereof, but are merely idealized representations employed to describe illustrative embodiments. The drawings are not necessarily to scale. Elements common between figures may retain the same numerical designation.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical," "lateral," "top," "bottom," "upper," and "lower" may refer to the orientations as depicted in the figures.

As used herein, the term "substantially" or "about" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even 100% met.

As used herein, the term "fluid" may mean and include fluids of any type and composition. Fluids may take a liquid form, a gaseous form, or combinations thereof, and, in some instances, may include some solid material. In some embodiments, fluids may convert between a liquid form and a gaseous form during a cooling or heating process as described herein.

Embodiments of the present disclosure may relate to heat exchangers for use in cooling or heating one fluid with another fluid, for example, without mixing the two fluids. In some embodiments, such heat exchangers or fluid coolers may be implemented with fluid management assemblies and systems, such as, for example, sealing assemblies, valve assemblies, pumps, etc. to assist in dissipating heat energy from such assemblies and systems.

Embodiments of the present disclosure may include fluid to fluid heat exchangers (e.g., fluid coolers, waste heat recovery units, radiators, evaporators, etc.) that operate by transferring heat from one fluid to another fluid through a thermally conductive material. The transfer of heat in such exchangers may be enhanced by increasing the surface area of the thermally conductive material in contact with each fluid. The increase in surface area may be achieved in several different ways. Such heat exchangers may accomplish the increase in surface area by increasing the length or number of tubes (e.g., pipes, passages, channels, etc.) through which the fluids pass. For example, in a shell tube heat exchanger multiple tubes may be used within one shell providing substantially more surface area in contact with each fluid. Such heat exchangers also accomplish the increased surface area through the use of fins attached to the tubes or passages through which one of the fluids passes. The fins transfer heat to or from the tube, which, in turn, transfers the heat to or from the fluid within the tube. The fins increase the surface area in contact with a fluid residing on the exterior of the tube.

FIG. 1 demonstrates an embodiment of a tube 102 (e.g., pipe, hose, conduit, passage, etc.) of a heat exchanger. In some embodiments, the tube 102 may have fins 104 (e.g., plates) protruding from the tube 102. The fins 104 may be spaced substantially evenly (e.g., at substantially common intervals) along the length of the tube 102. In some embodiments, the fins 104 may be spaced at intervals between about 1 mm and about 8 mm, where the interval is measured from the center of each fin 104. For example, the fins 104 may be spaced between about 3 mm and about 6 mm, or between about 4 mm and about 5 mm. In some embodiments, the fins 104 may be spaced at small intervals to generate more surface area. In other embodiments, the fins 104 may be spaced at larger intervals to enable fluids with higher viscosities to travel between the fins 104. In some embodiments, the presence of natural airflow (e.g., wind, stack effect, etc.) may allow for smaller intervals between the fins.

In some embodiments, the fins 104 may have a spiral configuration extending around the tube 102, where a middle section between two adjacent fins 104 may directly contact an outer surface of the tube 102 (e.g., to assist with heat transfer). As depicted, the fins 104 may have a substantially annular (e.g., circular) shape. In some embodiments, the fins 104 may be formed from an elongate strip of material wound around the tube 102 to form the substantially annular shape in a spiral configuration. In other embodiments, the fins 104 may have other shapes and configurations (e.g., a quadrilateral shape, a polygonal shape, a non-winding shape, the shapes and configurations discussed below, combinations thereof, etc.).

A first fluid 106 (e.g., working fluid, treated fluid, closed loop fluid, cooling fluid, etc.) may flow within the tube and a second fluid 108 (e.g., secondary cooling fluid, ambient fluid, renewable fluid, air, open loop fluid, etc.) may flow or reside along the exterior of the tube 102 and/or the fins 104. The second fluid 108 may be provided in a passive and/or active manner.

In some embodiments, the first fluid 106 flowing in the tube 102 may carry residual heat from a process, such as, for example, a refrigerant process, a combustion process, a seal lubrication system, industrial processes, etc. The first fluid 106 may transfer heat (e.g., heat energy) to the tube 102 as the first fluid 106 travels through the tube 102. The tube 102 may, in turn, transfer the heat from the first fluid 106 to the second fluid 108 through an exterior surface of the tube 102 and the fins 104. As the length of the tube 102 increases, the amount of heat energy capable of being transferred from the first fluid 106 to the second fluid 108 will also increase depending on process conditions.

In some embodiments, the length required to expel the required amount of heat can become prohibitive. Some systems require a length of between 1 meter and 10 meters. These lengths in a straight pipe can be prohibitive given space and maintenance requirements in many applications. For example, in industrial applications space for equipment is often limited because of the amount of equipment and the limited space in the area where the equipment is located. In some examples, the pipe may be positioned vertically to reduce the floor space; however, this may result in instrumentation and controls that cannot be reached without the aid of a ladder, scaffold, or other accessibility tool.

The tube 102 may be formed into a non-linear shape to reduce the amount of space consumed by the heat exchanger while maintaining the additional length. For example, the tube 102 may weave back and forth, such as the tubes in a fin plate heat exchanger (e.g., automotive radiator, hot water heating coil, cold water cooling coil, etc.). When the tube 102 weaves back and forth additional factors begin to affect the efficiency of the heat exchanger. For example, when the tube 102 weaves back and forth the sharp bends create additional back pressure in the system. In some applications, the additional back pressure may be desirable for reducing the flow and extending the amount of time the fluid spends within the heat exchanger. In other applications, such as low pressure systems, the additional back pressure may create additional problems. Additionally, the fins 104 are often in direct contact with each other or may be a single fin 104 contacting the tube 102 in multiple places and therefore transfer heat between different portions of the tube 102. In view of the above, fin plate exchangers often require forced flow of the second fluid 108 through the fin plate exchanger to efficiently transfer heat from the first fluid 106 to the second fluid 108.

In some embodiments, the tube 102 may be formed into stacked rings, such as, for example, a curve, spiral, looped, concentric, or helical coil. The helical coil eliminates the sharp bends present in the fin plate. However, additional factors may still affect the efficiency of the heat exchangers in both a fin plate heat exchanger and a helical coil. For example, as heat dissipates into the second fluid 108 from one portion of the tube 102, it may affect the heat transfer from the adjacent portions of the tube 102. For example, in the helical coil, the rings may be stacked one above the next. In some embodiments, as the heat dissipates into the second fluid 108 from the tube 102 in a lower ring it may dissipate upwards through the second fluid 108 toward the next or adjacent ring in the stack thereby heating the adjacent ring and reducing the amount of heat that can be dissipated from the portion of the tube 102 that defines that ring. As the heat transfers up through the second fluid, eventually a point is reached where the temperature difference between the second fluid and the first fluid is not sufficient to maintain efficient heat transfer between the two fluids.

Figure 2:
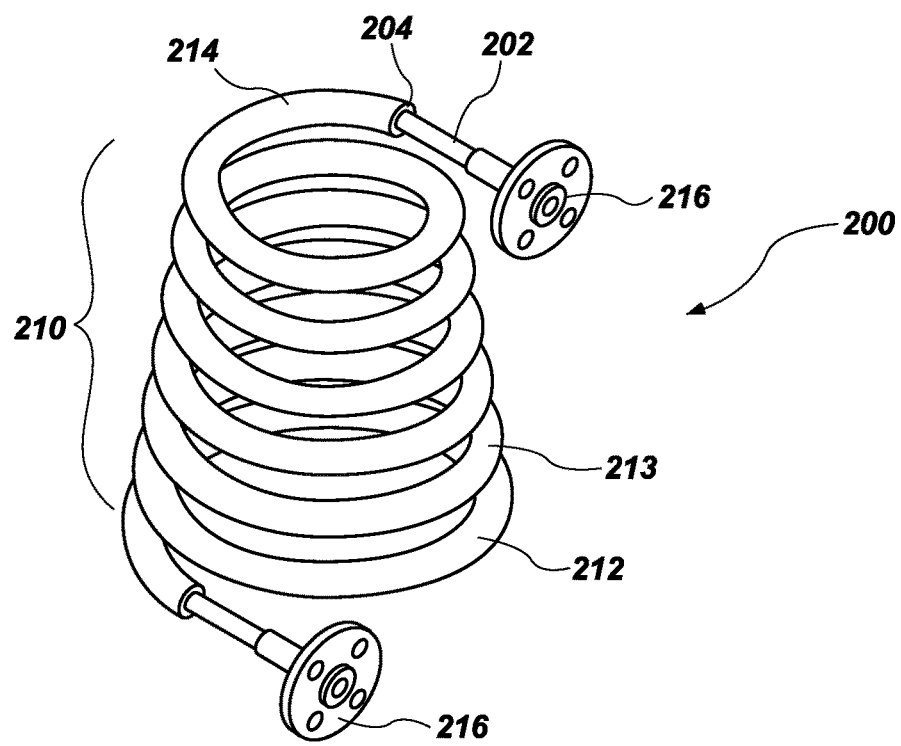
FIG. 2 is a perspective view of a fluid cooler according to an embodiment of the present disclosure.

FIG. 2 illustrates an embodiment of a fluid heat exchanger 200. In some embodiments, the fluid heat exchanger may include a pipe 202 with fins 204 extending radially outward from the surface of the pipe 202, which may include similar features, such as the fin configurations, of one or more of the pipes or tubes discussed herein. In some embodiments, the pipe 202 may include pipe connections 216 (e.g., coupling, union, dielectric union, nipple, bushing, double-tapped bushing, flanged connection, compression fittings, etc.) on the ends of the pipe for connection into a fluid cooling system (see FIGS. 5 and 6). As depicted, the pipe connections 216 may be positioned at opposing ends of the fluid heat exchanger 200. In other embodiments, the pipe connections 216 may be positioned on one end, side, or even middle portion of the fluid heat exchanger 200 where at least a portion of the pipe 202 may extend from a first pipe connection 216 and double back (e.g., return by traversing substantially the same route, for example, in a substantially parallel manner) to a second pipe connection 216 positioned proximate (e.g., adjacent) the first pipe connection 216.

In some embodiments, the pipe 202 may define a plurality of stacked rings 210 (e.g., loops, hoops, etc.). The plurality of stacked rings 210 may include one or more rings that exhibit differing dimensions from the adjacent stacked rings 210 (e.g., at least some of the stacked rings 210 are offset from an adjacent stacked ring 210). For example, at least some of the stacked rings 210 may be offset from an adjacent stacked ring 210 (e.g., in a lateral direction transverse to a longitudinal axis or centerline of the fluid heat exchanger 200, where the stacked rings 210 extend around the longitudinal axis). As depicted, the plurality of stacked rings 210 may be formed in a curved or annular (e.g., circular) shape with a gradually increasing or decreasing diameter, such that the plurality of stacked rings 210 defines a conical shape (e.g., conical coil, conical helix, conical spiral, etc.). Decreasing the diameters of the plurality of stacked rings 210 may increase the efficiency of the heat exchanger by decreasing the likelihood that heat energy will transfer in an unintended or undesirable manner between adjacent stacked rings 210 rather than transferring to the surrounding environment.

In some embodiments, the stacked rings 210 may have a different shape (e.g., annular, oval, rectangular, polygonal, quadrilateral, square, triangular, hexagonal, etc.). In some embodiments, the differing dimension may be, for example, the length of a side, altitude, diagonal, apothem, radius, etc.

In some embodiments, the stacked rings 210 may exhibit other shapes where the adjacent rings are still at least partially offset from one another. For example, the diameters of the rings (e.g., rings 212, 213, 214) may increase and decrease between each adjacent stacked ring 210 to define an undulating shape, rather than a normal conical shape.

In some embodiments, the stacked rings 210 may allow significantly longer pipes to be used in a confined space. For example, the pipe 202 may be between about 4 meters and 15 meters in length, such as, for example, between about 6 meters and 12 meters. When the pipe 202 is formed into stacked rings 210 the dimensions of the fluid heat exchanger 200 may be, for example, less than 1 meter in height and less than 0.5 meters in diameter.

In some embodiments, the stacked rings 210 may be formed in a conical shape with an apex angle (e.g., the angle between two lines tangential to the stacked rings 210 converging on a central axis of the conical stack) between about 10° and about 90°, such as between about 15° and about 50°, or about 20° and about 30°. For example, in some embodiments, a ratio of the spacing between the individual rings within the stacked rings 210 and the change in diameter of the rings 210 may be between about 1:1 and about 12:1, such as between about 5:1 and about 10:1, or about 7:1, where the first number is the spacing and the second number is the change in diameter.

In some embodiments, the pipe 202 may have a diameter between about 8 mm and about 84 mm, such as between about 15 mm and about 25 mm, or about 19 mm. In some embodiments, a thickness of the pipe 202 may be between about 1 mm and about 5 mm, such as between about 2.5 mm and about 4 mm. In some embodiments, the fins 204 may extend a height from the pipe 202 that is less than the diameter of the pipe 202. For example, the fins may extend a height of between about 2 mm and about 20 mm, such as between about 7 mm and about 12 mm, or about 10 mm.

In some embodiments, the pipe 202 may be formed from a thermally conductive material. For example, the pipe 202 may be formed from copper, aluminum, stainless steel, carbon steel, bronze, brass, titanium, or other metal alloys. In some embodiments, the pipe 202 may be formed from corrosion resistant materials that are also thermally conductive, such as, for example, stainless steel, chrome, nickel, iron, copper, tungsten, and titanium.

In some embodiments, the fins 204 may be formed from a thermally conductive material. For example, the fins 204 may be formed from copper, aluminum, stainless steel, carbon steel, bronze, brass, titanium, or other metal alloys. In some embodiments, the fins 204 may be formed from the same material as the pipe 202. In other embodiments, the fins 204 may be formed from a different material from the pipe 202. In some embodiments, the fins 204 may be formed as part of the pipe 202, such as by extrusion, molding, rolling, etc. In some embodiments, the fins 204 may be formed separately from the pipe 202 and attached thereto. The fins 204 may be attached through a process of, for example, soldering, welding (e.g., arc welding, laser welding, electric resistance welding, oxy-fuel welding, etc.), brazing, adhesives, etc.

Figure 7A:
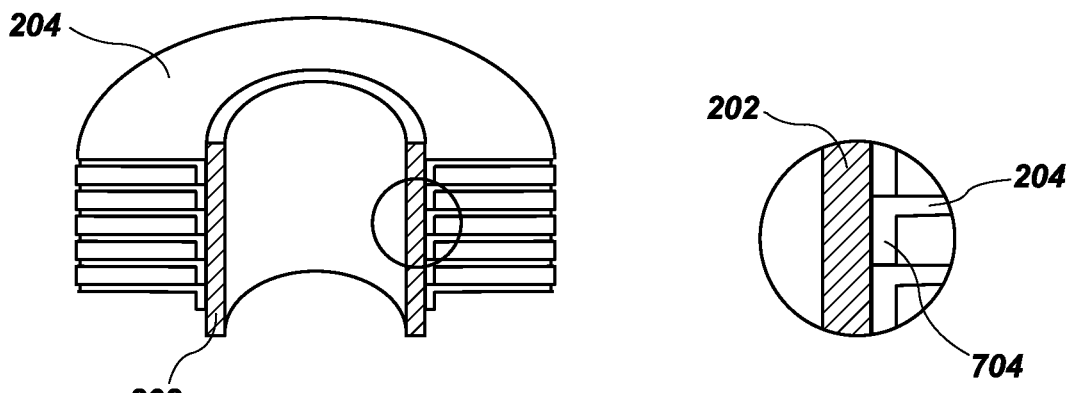
FIG. 7a is an enlarged view of a pipe fin configuration according to an embodiment of the present disclosure.

FIGS. 7a through 7e illustrate pipe and fin configuration in accordance with some embodiments of the disclosure. For example, the fins 204 may include an interface surface 704 (e.g., flange) that may define the spacing between the fins 204, as shown in FIG. 7a. The interface surface 704 may extend substantially perpendicular from the fin 204 forming a substantially flat surface to interface with a surface of the pipe 202.

Figure 7B:
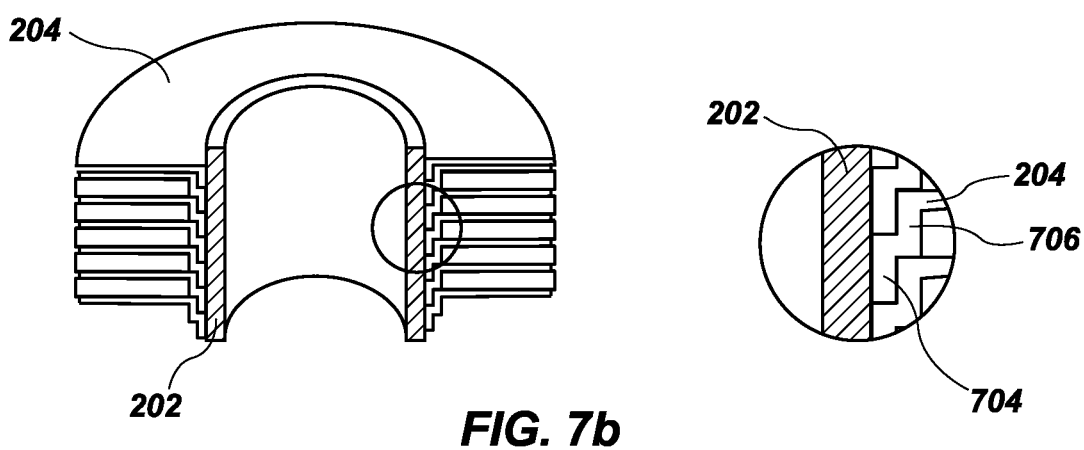
FIG. 7b is an enlarged view of a pipe fin configuration according to an embodiment of the present disclosure.

In some embodiments, the interface surface 704 may include an interlocking shelf 706, as shown in FIG. 7b. The interlocking shelf 706 may secure the fin 204 to an adjacent fin 204. As depicted, the interlocking shelf 706 may allow the fins 204 to support and/or secure the other adjacent fins 204.

Figure 7C:
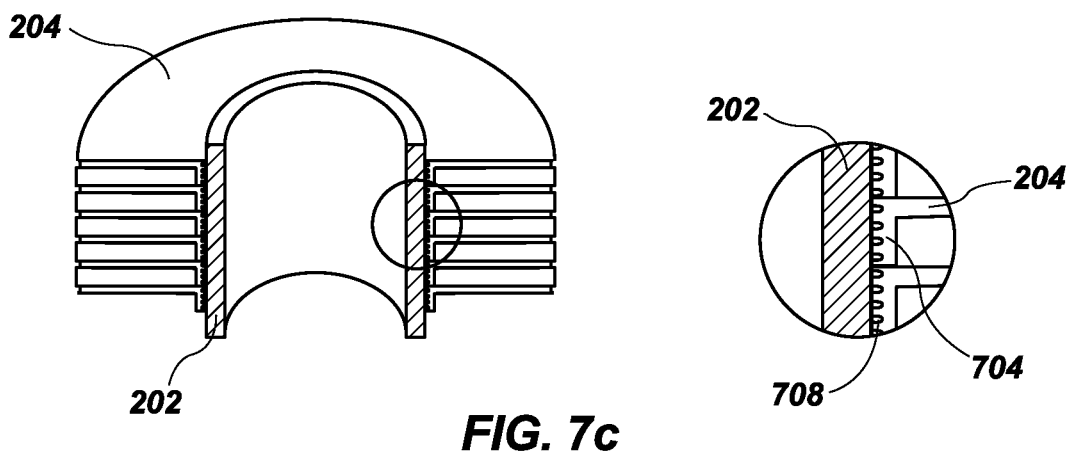
FIG. 7c is an enlarged view of a pipe fin configuration according to an embodiment of the present disclosure.

In some embodiments, the pipe may include a discontinuous feature (e.g., a knurled surface 708), as shown in FIG. 7c. The knurled surface 708 may interface with the interface surface 704 of the fins 204. In some embodiments, the knurled surface 708 may secure the interface surface 704 substantially limiting or preventing lateral motion along the surface of the pipe.

Figure 7D:
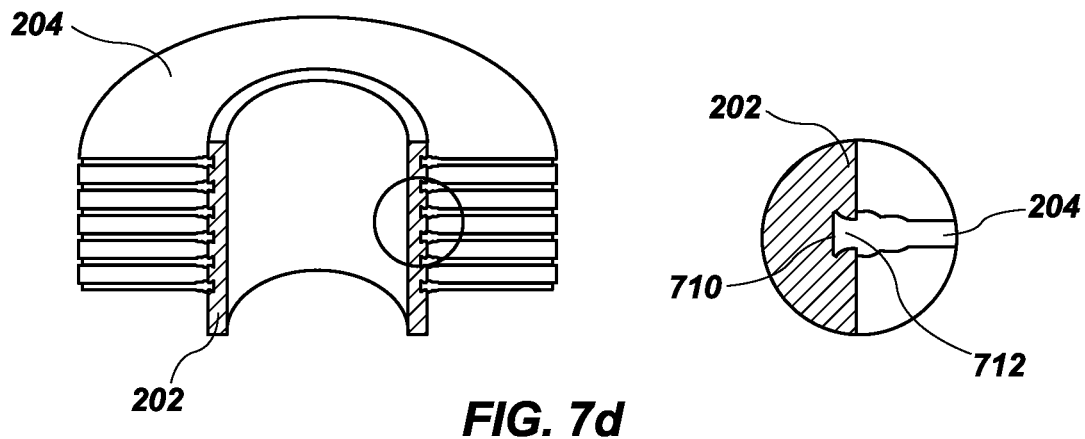
FIG. 7d is an enlarged view of a pipe fin configuration according to an embodiment of the present disclosure.

In some embodiments, the interface between the fins 204 and the pipe 202 may a tongue and groove interface (e.g., half lap joint, dovetail joint) as shown in FIG. 7d. As depicted, the pipe 202 may include a groove 710. The fins 204 may include a complementary base 712 (e.g., tongue, tenon) that may fit within the groove 710. In some embodiments, the complementary base 712 may be secured within the groove 710 by an interference fit (e.g., compression fit, press fit, friction fit). In some embodiments, the complementary base 712 and the groove 710 may be a loose fit, wherein the groove 710 may substantially prevent lateral motion along the surface of the pipe 202, while allowing motion within (e.g., along) the groove 710 to facilitate heat expansion and accommodate different rates of expansion, etc.

In some embodiments, the fins 204 may be extruded or rolled from the pipe 202.

Figure 7E:
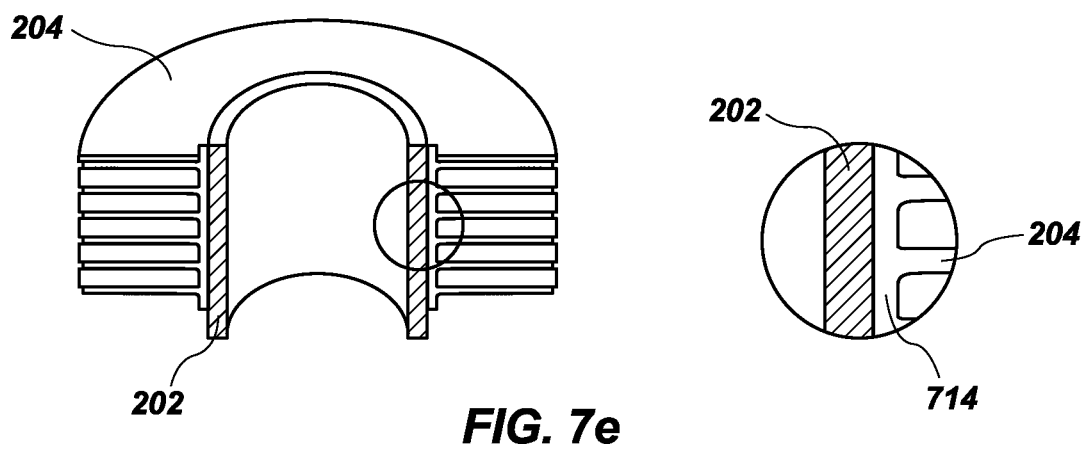
FIG. 7e is an enlarged view of a pipe fin configuration according to an embodiment of the present disclosure.

In some embodiments, the fins 204 may be extruded or rolled from a separate sleeve material 714 (e.g., a continuous material) within which the pipe may be inserted, as shown in FIG. 7e. The interface between the pipe 202 and the sleeve material 714 may be an interference fit. In some embodiments, the interface between the pipe 202 and the sleeve material 714 may include knurled surfaces on at least one of a surface of the pipe 202 or a surface of the sleeve material 714.

Figure 3:
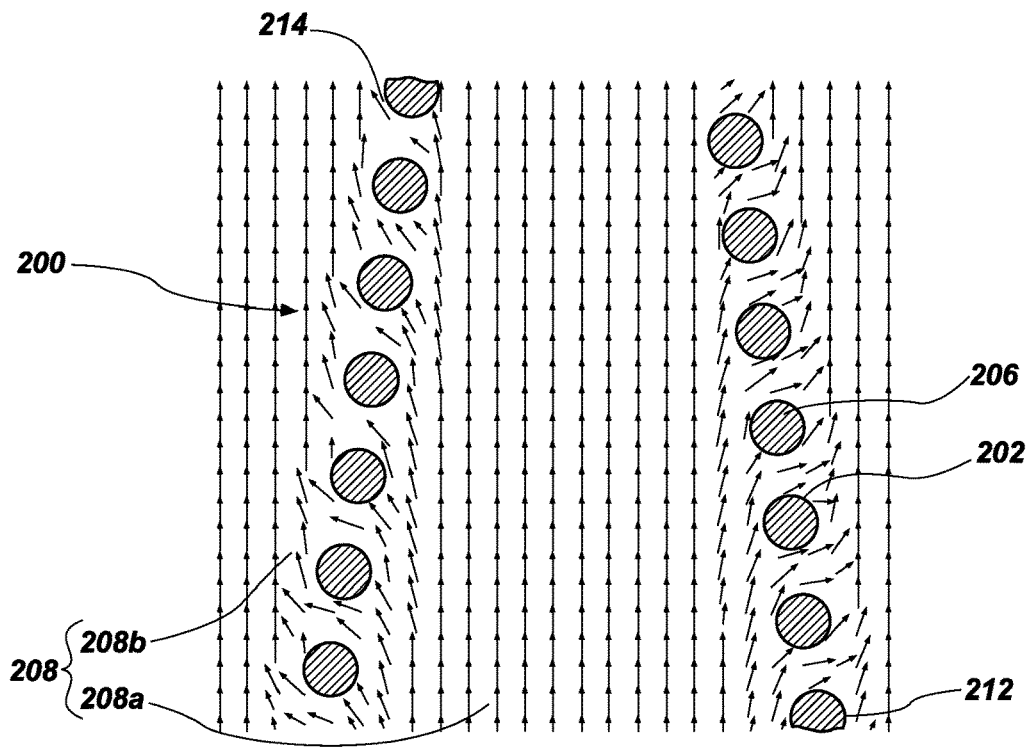
FIG. 3 is a view of a temperature profile for a fluid cooler according to an embodiment of the present disclosure.

FIG. 3 illustrates a temperature profile of the fluid heat exchanger 200. As depicted, a first fluid 206 may flow within the pipe 202. A second fluid 208 may be provided on the exterior of the pipe 202. In some embodiments, the second fluid 208 may be ambient air. In other embodiments, the second fluid 208 may be another fluid, such as, for example, water, oil, or other coolants. In some embodiments, the plurality of stacked rings 210 may be arranged such that the conical shape is substantially vertical. In some embodiments, the largest ring 212 may be located on the bottom and the smallest ring 214 may be located on the top of the conical shape (e.g., in the vertical orientation as shown in FIG. 3). In another embodiment, the conical shape may be inverted with the largest ring 212 on the top of the conical shape and the smallest ring 214 on the bottom of the conical shape. In other embodiments, the conical shape may include repeating the above configuration in a stacked manner.

In some embodiments, the first fluid 206 may carry heat energy from another process. The heat energy of the first fluid 206 may induce a flow on the second fluid 208 through natural or passive convection. The second fluid 208 may enter at the bottom of the conical shape as a cool fluid 208a. As heat is transferred to the cool fluid 208a, the cool fluid 208a may transition to a warm fluid 208b (e.g., a warmer fluid 208b having a temperature greater than the cool fluid 208a), which has a lower density than the cool fluid 208a and will generally move in an upward direction relative to the cool fluid 208a. The upward movement of the warm fluid 208b may create a natural flow through the conical shape. The warm fluid 208b will naturally move from the inside of the conical shape to the outside of the conical shape and continue upwards. This movement may create a low pressure volume inside the conical shape that will, in turn, draw the cool fluid 208a through the bottom of the conical shape to replace the fluid that transitioned to warm fluid 208b.

In some embodiments, the conical or otherwise offset shape may reduce the effect of the lower rings of the plurality of stacked rings 210 on the upper rings of the plurality of stacked rings 210 (e.g., to reduce the heating effects of the lower rings on upper rings that are adjacent to one or more of the lower rings). For example, the natural convection may induce a flow (e.g., an at least partially lateral flow) in the second fluid 208 from the inside of the conical shape to the outside of the conical shape through the spaces between the plurality of rings 210 rather than from a top surface of a lower ring to a bottom surface of an upper ring. The induced flow may remove heat from both the upper ring and the lower ring at a substantially similar rate because the cool fluid 208a may be a substantially uniform temperature throughout the inside portion of the conical shape and the cool fluid 208a may be drawn through the spaces between the plurality of rings 210 at a substantially uniform rate.

Figure 4:
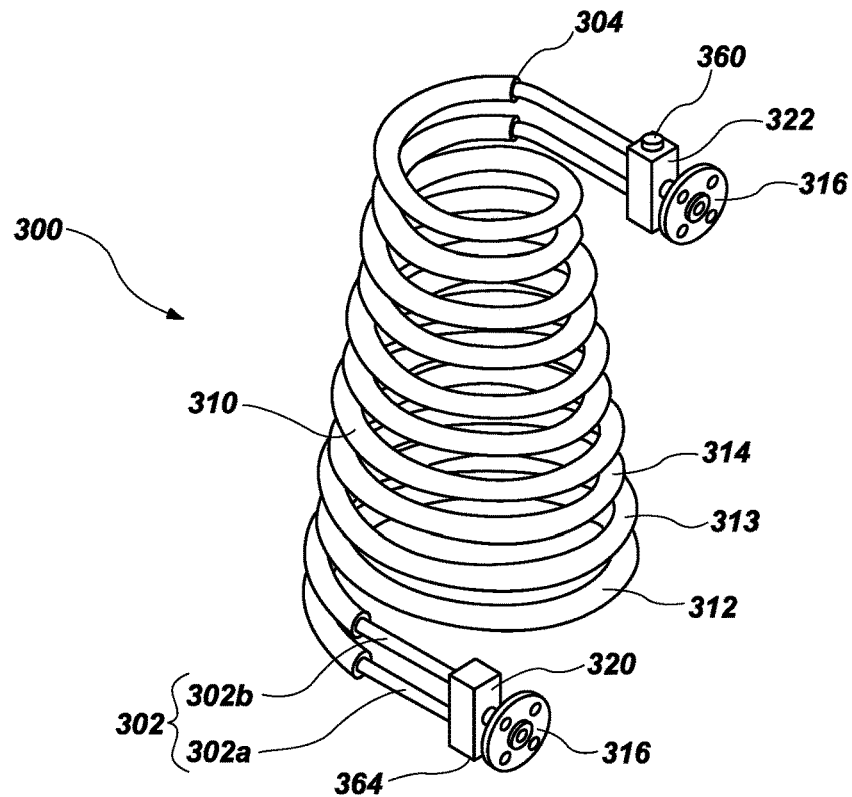
FIG. 4 is a perspective view of a fluid cooler according to an embodiment of the present disclosure.

FIG. 4 illustrates an embodiment of a heat exchanger 300. As depicted, the heat exchanger 300 may include a plurality of tubes 302 (e.g., two, three, four, five, or more tubes 302, which may include similar features, such as the fin configurations, of one or more of the pipes or tubes discussed herein). For example, the heat exchanger 300 may include a first tube 302a and a second tube 302b. The tubes 302 may include fins 304 along the length of each of the tubes 302. The tubes 302 may define a plurality of rings 310. In some embodiments, the rings 310 may alternate with one ring defined with the first tube 302a and the next ring defined with the second tube 302b. The first and second tubes 302a, 302b may define a conical structure by extending side by side in a substantially parallel manner along a coiled path.

In some embodiments, a first ring 312 defined with the first tube 302a may have the largest diameter of the plurality of rings 310. In some embodiments, the second ring 313 defined with the second tube 302b may be the same diameter as the first ring 312. In other embodiments, the second ring 313 may have a smaller diameter than the first ring 312. In some embodiments, a third ring 314 defined with the first tube 302a may have a diameter smaller than both the first ring 312 and the second ring 313. Such a pattern of offset rings 310 may continue along a length or longitudinal axis of the heat exchanger 300.

As depicted, the plurality of tubes 302 may be connected at a first manifold 320 and a second manifold 322. The first manifold 320 and the second manifold 322 may create a common passageway between the tubes 302 enabling the plurality of tubes 302 to operate in parallel. In some embodiments, parallel operation may reduce backpressure caused by the heat exchanger 300 by reducing the actual length of the curved tubes 302. A reduction in back pressure may enable the use of tubes 302 having a smaller diameter for increased heat transfer. In some embodiments, parallel operation may result in a long effective length of the plurality of tubes 302 with a shorter actual length of the tubes 302a, 302b. For example, if the individual tubes 302a, 302b are each 6 meters in length, the effective length of the heat exchanger may be about 12 meters.

While the tubes 302a, 302b exhibit a substantially parallel configuration with common pipe connections 316, in other embodiments, the tubes 302a, 302b may be otherwise entwined together (e.g., with separate pipe connections, twisted in an overlapping configuration, with mirrored spiral configurations, etc.).

In some embodiments, the individual tubes 302a, 302b may be isolated from each other. For example, the first tube 302a may be connected to a first fluid source and the second tube 302b may be connected to a second fluid source. In some embodiments, the first fluid source and the second fluid source may be connected to the same fluid reservoir or heat source. In another embodiment, the first fluid source and the second fluid source may be connected to separate fluid reservoirs or heat sources of the same system. In another embodiment, the first fluid source and the second fluid source may be connected to different systems that are routed to a common location of the heat exchanger 300 (e.g., while entering or exiting the heat exchanger 300) for other reasons, such as environmental conditions or space considerations.

Figure 5:
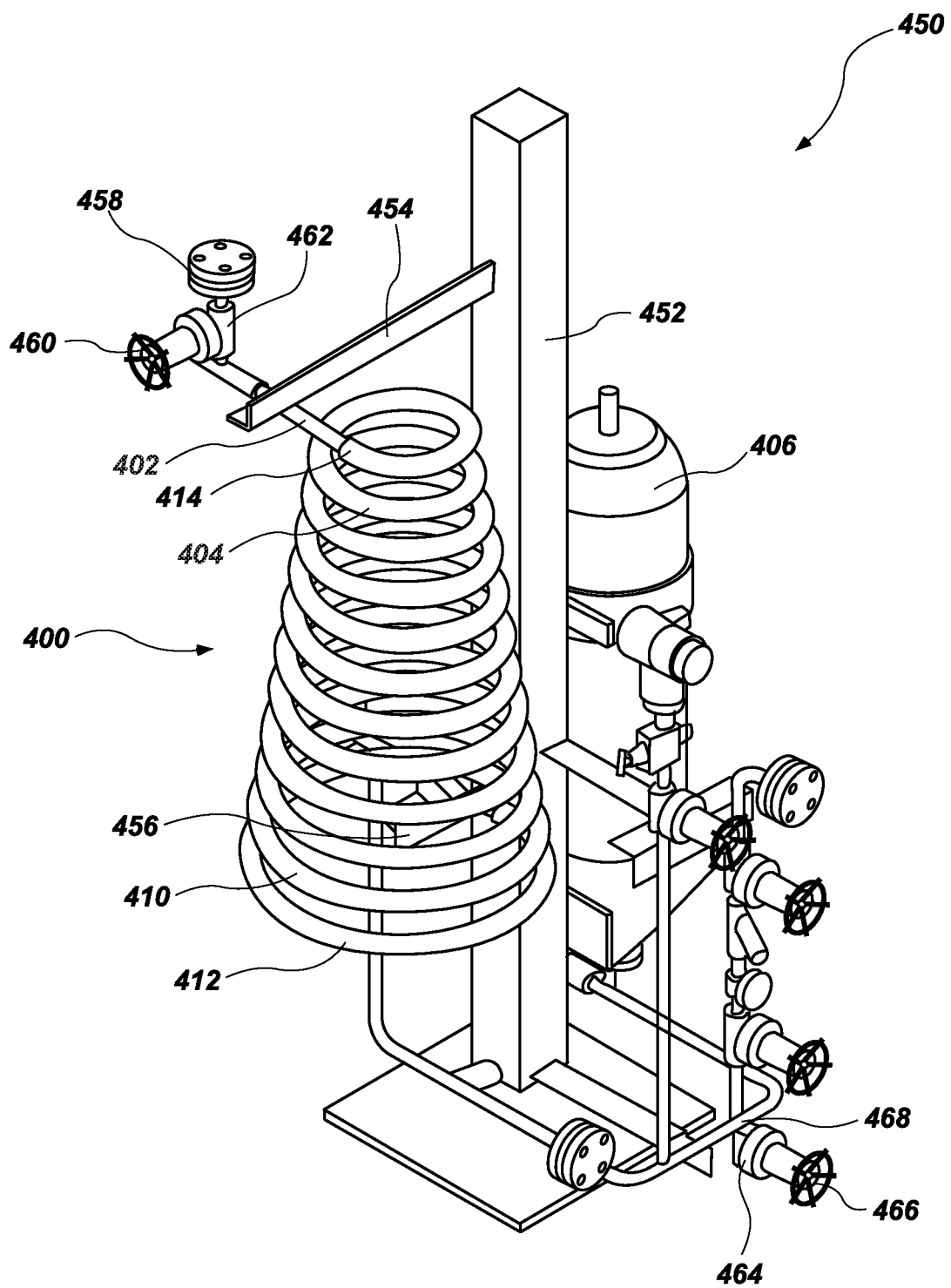
FIG. 5 is a perspective view of a fluid cooler system according to an embodiment of the present disclosure.

FIG. 5 illustrates an embodiment of a heat exchanger 400 as part of a fluid cooling system 450. The tube 402 of the heat exchanger 400 includes fins 404 along substantially the entire length of a tube 402, which may include similar features, such as the fin configurations, of one or more of the pipes or tubes discussed herein. The tube 402 may define a series of loops 410 of decreasing/increasing diameter. In some embodiments, the fluid cooling system 450 may include a frame 452. The fluid cooling system 450 may include a top connection point 454 (e.g., flange, bracket, support, etc.) that may connect to the top loop 414 of the heat exchanger 400. The fluid cooling system 450 may include a bottom connection point 456 that may connect to the bottom loop 412 of the heat exchanger. In some embodiments, the series of loops 410 may be configured (e.g., mounted on the frame 452) to move and absorb some vibration and shock from equipment movement and operation. For example, additional connection points may connect the frame to the heat exchanger at additional loops within the series of loops 410 to limit the movement of the series of loops to prevent fatigue failure of the heat exchanger.

In some embodiments, a vent 458 may be located at a high point (e.g., uppermost point, top, etc.) on the heat exchanger 400. The vent 458 may include a vent valve 460 and a vent pipe 462. The vent valve 460 may be opened to bleed air from the fluid cooling system 450 through the vent pipe 462.

In some embodiments, a drain 464 may be located at a low point (e.g., lowermost point, bottom, etc.) on the heat exchanger 400. The drain 464 may include a drain valve 466 and a drain pipe 468. The drain valve 466 may be opened to remove fluid from the fluid cooling system 450 for maintenance, repairs, or removal.

As depicted, the fluid cooling system 450 may include an expansion tank 406 (e.g., bladder, diaphragm, etc.) to accommodate volume changes of the cooling fluid as the temperature of the cooling fluid changes.

Referring back to FIG. 4, some embodiments may include a plurality of tubes 302 and manifolds 320, 322 connecting the plurality of tubes 302. A vent 360 may be included in the top manifold 322 and/or a drain 364 may be included in the bottom manifold 320. For example, the vent 360 may be a spring valve, a bleed screw, a bleed port, a plug, or a vent pipe and valve combination. In some embodiments, a drain 364 may be included in the bottom manifold 320. The drain 364 may be a spring valve, a bleed screw, a bleed port, a plug, or a drain pipe and valve combination.

Figure 6:
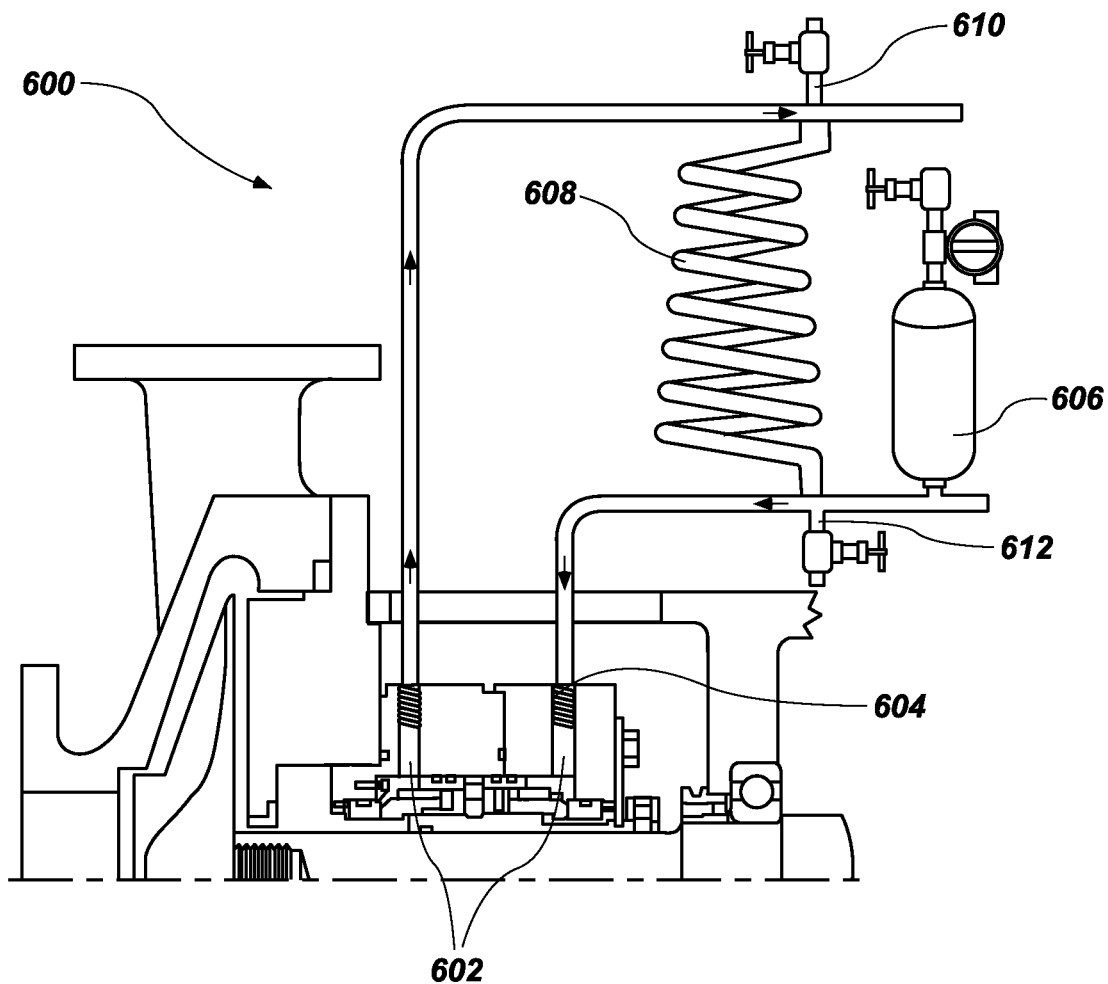
FIG. 6 is a schematic of a fluid cooler system according to an embodiment of the present disclosure.

FIG. 6 illustrates a schematic of a fluid cooling system 600. In some embodiments, a fluid cooling system may be connected to a mechanical or pump seal 602 (e.g., shaft seal, dual seals, dual pressurized seals, etc.). Pump seals 602 generate significant amounts of heat when a pump is in operation. In some embodiments, a pump seal 602 may include a pump ring 604 (e.g., radial flow pumping ring or axial flow pumping ring) for moving a cooling fluid through the pump seals 602 for a fluid flush of the pump seal 602. A fluid flush of the pump seal 602 may remove heat from the pump seal 602 and may also lubricate the pump seal 602.

In some embodiments, the fluid cooling system 600 may be a closed loop system. A closed loop system may be necessary, for example, when the cooling fluid is hazardous or toxic, has high vapor pressure, has special additives (e.g., glycol, scale preventers, etc.), and/or the pumped fluid is not conducive to cooling and/or lubricating seals (e.g., dirty, abrasive, or polymerizing fluids). The cooling fluid may be completely isolated from the pumped fluid. The closed loop system may include an expansion tank 606 (e.g., bladder, diaphragm, etc.) to accommodate volume changes of the cooling fluid as the temperature of the cooling fluid changes. The fluid cooling system 600 may include a conical coil 608 (e.g., similar to those discussed herein) for removing heat from the system (e.g., from the cooling fluid as it passes through the conical coil 608). The fluid cooling system 600 may also include a vent 610 and a drain 612 for removing and adding fluid to the system for maintenance, repair, or replacement processes.

The embodiments of the present disclosure may provide more efficient passive heat exchanger systems, where implemented. The embodiments may induce natural convective flow in a secondary cooling medium to remove heat more efficiently. Passive heat exchangers may provide additional cost saving benefits because of the reduced amount of hardware required and the reduced amount of moving parts that require maintenance.

Some embodiments may increase the effective length of the heat exchanger while maintaining easy access to any instrumentation and controls that may be present on the top and bottom of the heat exchanger. The increased effective length may increase the efficiency of the heat exchanger, while the compact design may provide space saving benefits in industries where floor space is a premium commodity.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope of the disclosure as contemplated by the inventors.

What is claimed is:

1. A fluid heat exchanger comprising:
a frame supporting the heat exchanger;
a fluid inlet comprising a first fitting at an upper end of the fluid heat exchanger to receive a fluid comprising a heated fluid from a seal assembly connected to the fluid heat exchanger;
a fluid outlet comprising a second fitting at a lower end of the fluid heat exchanger to return the fluid to the seal assembly after transferring heat energy between the heated fluid and another fluid on an exterior of the fluid heat exchanger;
at least two tubes extending between the fluid inlet and the fluid outlet, the at least two tubes defining a substantially conical coil, the at least two tubes extending around a longitudinal axis of the fluid heat exchanger, a centerline of the conical coil defined by the at least two tubes being coextensive with a vertical axis extending perpendicular to a lateral surface over which the frame is positioned, the conical coil reducing in diameter along the vertical axis, each tube of the at least two tubes having at least one arcuate section that is laterally offset from another arcuate section of the at least two tubes in a direction transverse to the longitudinal axis, the at least two tubes defining the conical coil being axially spaced and laterally offset to define openings between sections of the at least two tubes to induce a flow on the another fluid flowing around the at least two tubes through passive convection, the conical coil of the at least two tubes configured to create a low pressure volume inside the conical coil in order to draw the another fluid into the conical coil at a lower enlarged opening end comprising a larger diameter at the lower end of the fluid heat exchanger and to displace the another fluid through the conical coil upwards to an upper reduced opening end comprising a reduced diameter at the upper end of the fluid heat exchanger, the reduced diameter being less than the larger diameter of the lower enlarged opening end, the at least two tubes being only partially laterally offset such that adjacent loops of the substantially conical coil at least partially laterally overlap in a direction along the longitudinal axis of the fluid heat exchanger, the upper reduced opening end located relatively further away from the lateral surface over which the frame is positioned as compared to the lower enlarged opening end located relatively closer to the surface over which the frame is positioned; and
a plurality of fins attached to an exterior surface of the at least two tubes, the plurality of fins having spiral configuration extending around the at least two tubes, a middle section extending between and connecting two adjacent fins being in direct contact an outer surface of the at least two tubes in order to assist with heat transfer; and
the first fitting and the second fitting coupled to the at least two tubes to enable fluid flow into and out of the at least two tubes in order to transfer the heat energy between the heated fluid within the at least two tubes and the another fluid on the exterior of the fluid heat exchanger proximate the at least two tubes and the plurality of fins, the at least two tubes being connected to the first fitting at an upper position of the conical coil along the vertical axis relatively further away from the surface over which the frame is positioned and the second fitting at lower position of the conical coil along the vertical axis relatively closer to the surface over which the frame is positioned;
the fluid heat exchanger lacking any structure enclosing the conical coil of the at least two tubes such that the conical coil of the at least two tubes is open to surrounding environment on lateral and axial sides of the conical coil; and
the fluid heat exchanger comprising a closed loop system where the heated fluid is separated from a process fluid which the heated fluid is to cool.

2. The fluid heat exchanger of claim 1, wherein the conical coil comprises a first loop and a second loop, wherein the first loop has a dimension larger than a corresponding dimension of the second loop.

3. The fluid heat exchanger of claim 2, wherein the first loop and the second loop have a circular shape.

4. The fluid heat exchanger of claim 2, further comprising a third loop with a dimension smaller than the corresponding dimension of the second loop and the dimension of the first loop.

5. The fluid heat exchanger of claim 1, wherein the plurality of fins are evenly spaced along a length of the at least two tubes.

6. The fluid heat exchanger of claim 1, wherein the plurality of fins extend a distance less than a diameter of the at least two tubes from the exterior surface of the at least two tubes.

7. The fluid heat exchanger of claim 1, further comprising an expansion tank configured to accommodate volume changes of the heated fluid as the temperature of the heated fluid changes.

8. The fluid heat exchanger of claim 1, wherein the heated fluid is configured to be contained in the closed loop system of the fluid heat exchanger and to be completely separated from the process fluid comprising a pumped fluid traveling through the seal assembly.

9. A seal system comprising:
a fluid cooler comprising the fluid heat exchanger of claim 1; and
the seal assembly connected to the fluid cooler, the fluid cooler configured to receive fluid from a portion of the seal assembly in order to transfer heat energy between the fluid within the conical coil and the another fluid on an exterior of the conical coil proximate the conical coil and the fins.

10. The seal system of claim 9, wherein the seal assembly comprises a pump.

11. A method of cooling a fluid, the method comprising:
transferring fluid from a fluid assembly comprising one or more fluid seals to a heat exchanger comprising the fluid heat exchanger of claim 1;
passing the fluid through the conical coil of the heat exchanger between a first end of the conical coil to a second end of the conical coil, a first portion of the conical coil having a diameter that is greater than an adjacent second portion of the conical coil; and
cooling the fluid during the passing of the fluid through the conical coil between transferring heat energy from the fluid within the at least two tubes to the another fluid on an exterior of the at least two tubes.

12. The method of claim 11, further comprising passively convecting the fluid through the heat exchanger by supplying relatively warmer fluid at a bottom portion of the heat exchanger in order to induce flow of the relatively warmer fluid up through the heat exchanger to relatively cooler fluid in an upper portion of the heat exchanger.

13. A fluid heat exchanger comprising:
a frame supporting the heat exchanger;
a tube defining a substantially conical coil, a centerline of the substantially conical coil defined by the tube being coextensive with a vertical axis extending perpendicular to a lateral surface over which the frame is positioned, the tube extending around a longitudinal axis of the fluid heat exchanger, the tube having at least one arcuate section that is laterally offset from another arcuate section of the tube in a direction transverse to the longitudinal axis, the at least one arcuate section of the tube being only partially laterally offset from the another arcuate section of the tube such that adjacent loops of the substantially conical coil only partially laterally overlap in a direction along the longitudinal axis of the fluid heat exchanger;
fins attached to an exterior surface of the tube, each fin of the fins having a middle section extending between two adjacent fins being in direct contact an outer surface of the tube in order to assist with heat transfer; and
at least one fitting coupled to the tube to enable fluid flow into and out of the tube in order to transfer heat energy between fluid within the tube and another fluid on an exterior of the tube proximate the tube and the fins; and the fluid heat exchanger lacking any structure enclosing the conical coil of the tube such that the conical coil of the tube is open to surrounding environment on lateral and axial sides of the conical coil and is unencumbered by surrounding structures; and
the fluid heat exchanger comprising a closed loop system where the fluid within the tube is separated from a process fluid which the fluid within the tube is to cool.

14. The fluid heat exchanger of claim 13, wherein the tube comprises at least two pipes defining the conical coil.

15. The fluid heat exchanger of claim 13, wherein the tube comprises a discontinuous feature at an interface between the middle section of the fins and the tube.

16. The fluid heat exchanger of claim 13, wherein a first end of the tube is positioned at a first longitudinal end of the conical coil and a second end of the tube is positioned at a second, opposing longitudinal end of the conical coil, wherein a first fitting of the at least one fitting is positioned at the first end and a second fitting of the at least one fitting is positioned at the second end.

17. A fluid heat exchanger comprising:
a frame supporting the heat exchanger;
a fluid inlet comprising a first fitting at an upper end of the fluid heat exchanger to receive a fluid comprising a heated fluid from a seal assembly connected to the fluid heat exchanger;
a fluid outlet comprising a second fitting at a lower end of the fluid heat exchanger to return the fluid to the seal assembly after transferring heat energy between the heated fluid and another fluid on an exterior of the fluid heat exchanger, wherein the fluid heat exchanger comprises a closed loop system where the heated fluid is separated from any process fluid of the seal assembly;
a tube extending between the fluid inlet and the fluid outlet, the tube comprising arcuate sections that collectively define a substantially conical coil, the tube extending around a longitudinal axis of the fluid heat exchanger, a centerline of the conical coil defined by the tube being coextensive with the longitudinal axis of the fluid heat exchanger extending perpendicular to a lateral surface over which the frame is positioned, each of the arcuate sections being spaced from and laterally offset in a direction transverse to the longitudinal axis of the tube from each adjacent arcuate section of the tube, the actuate sections defining the conical coil with the actuate sections being both axially and laterally spaced and laterally offset to define openings between sections of the tube to induce a flow on a fluid flowing around the tube through passive convection, the actuate sections of the tube being only partially laterally offset such that adjacent loops of the substantially conical coil partially laterally overlap; and
fins attached to an exterior surface of the tube.

18. The fluid heat exchanger of claim 17, wherein an interface between the tube and the fins comprises at least one of a flange extending between adjacent fins and beyond each of the adjacent fins on opposing sides of the adjacent fins.

19. The fluid heat exchanger of claim 18, wherein the flange extending between adjacent fins includes one of an interlocking interface between the fins, a knurled portion between adjacent fins, or a continuous portion between adjacent fins.

20. The fluid heat exchanger of claim 18, the fins having a spiral configuration extending around the tube, the flange extending between and connecting two adjacent fins being in direct contact an outer surface of the tube in order to assist with heat transfer.

* * * * *